(12) United States Patent
Chalk

(10) Patent No.: US 10,388,061 B2
(45) Date of Patent: Aug. 20, 2019

(54) GENERATION OF LIGHTING DATA FOR A THREE-DIMENSIONAL ENTITY

(71) Applicant: Microsoft Technology Licensing, LLC, Redmond, WA (US)

(72) Inventor: Daniel James Chalk, Ibstock (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 15/439,609

(22) Filed: Feb. 22, 2017

(65) Prior Publication Data

US 2018/0240266 A1 Aug. 23, 2018

(51) Int. Cl.
| | | |
|---|---|---|
| G06T 15/50 | (2011.01) | |
| G06T 15/60 | (2006.01) | |
| G06T 15/80 | (2011.01) | |
| G06T 17/20 | (2006.01) | |

(52) U.S. Cl.
CPC .............. *G06T 15/50* (2013.01); *G06T 15/60* (2013.01); *G06T 15/80* (2013.01); *G06T 17/205* (2013.01)

(58) Field of Classification Search
CPC ........... G06T 15/50; G06T 1/20; G06T 15/06; G06T 15/60; G06T 15/80; G06T 17/20
See application file for complete search history.

(56) References Cited

U.S. PATENT DOCUMENTS

| | | | |
|---|---|---|---|
| 5,742,749 A | 4/1998 | Foran et al. | |
| 7,012,615 B2 | 3/2006 | Kraemer | |
| 7,348,977 B2 | 3/2008 | West et al. | |
| 7,719,544 B2 | 5/2010 | Boyd et al. | |
| 8,462,156 B1 | 6/2013 | Fernando | |
| 8,805,097 B2 * | 8/2014 | Ahn | G06T 9/001 382/232 |
| 2009/0109219 A1 * | 4/2009 | DeCoro | G06T 17/20 345/423 |
| 2014/0168360 A1 * | 6/2014 | Ahn | H04N 13/161 348/42 |
| 2017/0169608 A1 * | 6/2017 | Starhill | G06T 17/10 |

OTHER PUBLICATIONS

Green, Simon, "Real-Time Approximations to Subsurface Scattering", http://http.developer.nvidia.com/GPUGems/gpugems_ch16.html, Published on: Sep. 2007, 13 pages.

(Continued)

*Primary Examiner* — Abderrahim Merouan

(57) ABSTRACT

A method of automatically generating lighting data for a three-dimensional computer generated entity is described. A mesh representation of at least a part of the entity is received and simplified by removing vertices from the mesh. For each vertex in the simplified mesh, a plurality of rays are propagated from the vertex and a cone-shaped region is then defined for the vertex using those of the plurality of rays that do not intersect with the simplified mesh, wherein the cone-shaped region is defined in terms of a vector and an angular parameter. An angular parameter and a vector for each vertex in the received mesh is then calculated by interpolating the angular parameters and vectors for each vertex in the simplified mesh and lighting data is output, the lighting data comprising the angular parameter and vector for each vertex in the received mesh.

20 Claims, 11 Drawing Sheets

(56) References Cited

OTHER PUBLICATIONS

Knecht, Martin, "State of the Art Report on Ambient Occlusion", In Technical Report of Vienna Institute of Technology, Nov. 2007, 12 pages.
Hauagge, et al., "Photometric Ambient Occlusion", In Proceedings of IEEE Conference on Computer Vision and Pattern Recognition, Jun. 23, 2013, pp. 1-8.
Garawany, Ramy EL, "Deferred Lighting in Uncharted 4", http://advances.realtimerendering.com/s2016/, Published on: Aug. 3, 2016, 6 pages.
SIGGRAPH2016, "The Technical Art of Uncharted 4", http://advances.realtimerendering.com/other/2016/naughty_dog/, Aug. 6, 2016, 1 page.

\* cited by examiner

GENERATION OF LIGHTING DATA FOR A THREE-DIMENSIONAL ENTITY

BACKGROUND

It is possible to generate shadows on a static object using ray-tracing, but this is computationally expensive. For three-dimensional computer generated characters which move (e.g. under the control of a user) the generation of shadows, and more generally lighting data, needs to be performed in real-time (i.e. as the character moves) and this means that the available computational resource is limited.

The embodiments described below are not limited to implementations which solve any or all of the disadvantages of known systems and methods for generating lighting data for three-dimensional computer generated characters.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of automatically generating lighting data for a three-dimensional computer generated entity, such as a character or object, is described. A mesh representation of at least a part of the entity is received and simplified by removing vertices from the mesh (e.g. those vertices having an opacity below a threshold level). For each vertex in the simplified mesh, a plurality of rays are propagated from the vertex and a cone-shaped region having its apex at the vertex is then defined for the vertex using those of the plurality of rays that do not intersect with the simplified mesh, wherein the cone-shaped region is defined in terms of a vector and an angular parameter. An angular parameter and a vector for each vertex in the received mesh is then calculated by interpolating the angular parameters and vectors for each vertex in the simplified mesh and lighting data is output, the lighting data comprising the angular parameter and vector for each vertex in the received mesh.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
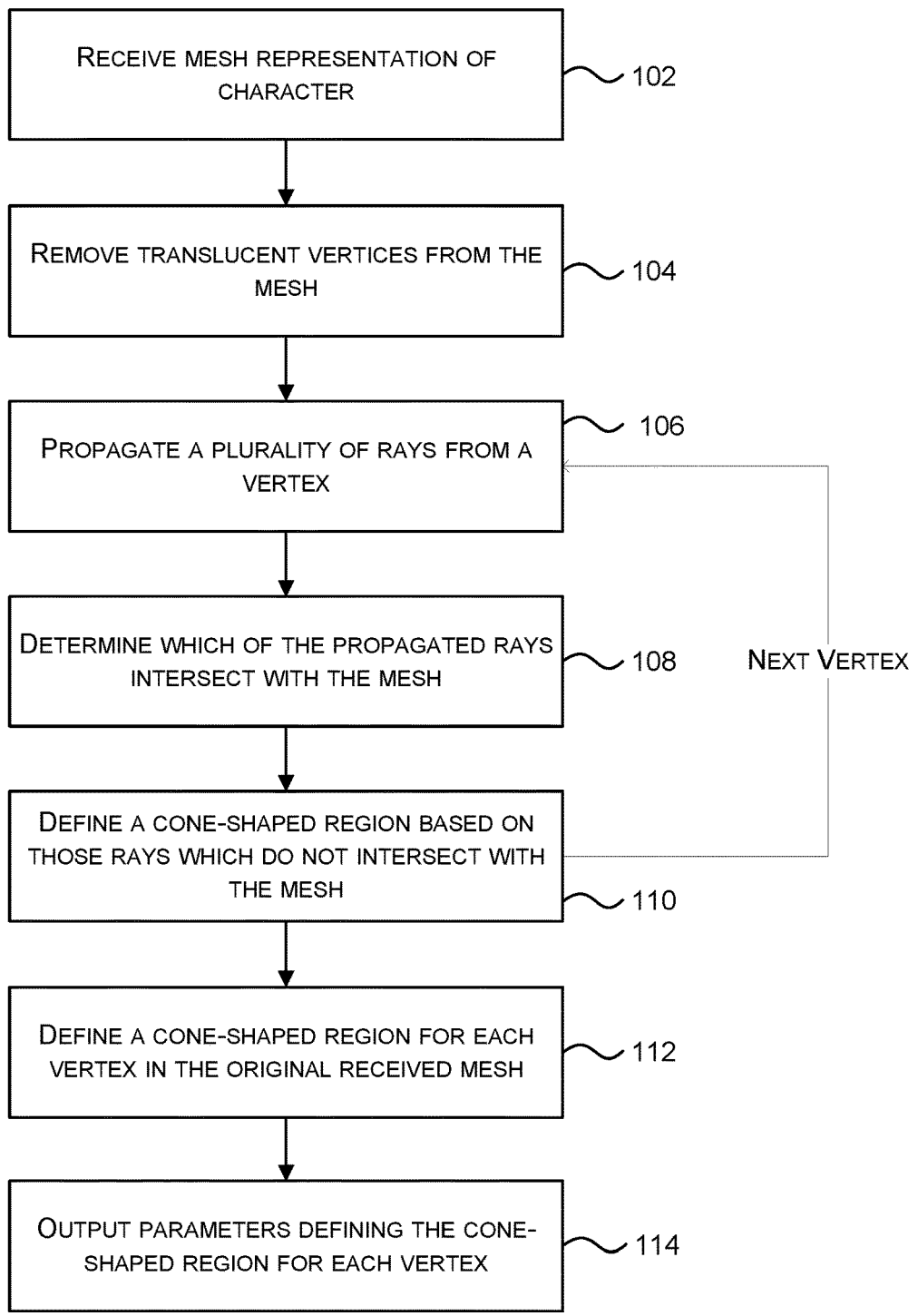
FIG. 1 is a flow diagram of an example method of generating lighting data for a three-dimensional computer generated character.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, generation of shadows, sub-surface scattering and more generally lighting data, for a three-dimensional computer generated character is computationally expensive. In order that the computations can be performed in real-time, approximations may be used; however, these approximations typically lead to incorrect lighting (e.g. rim light and sub-surface scattering under the chin and nose of a human character). The approximations also typically ignore sub-surface scattering which is when light that is incident on a translucent object is not simply reflected off the surface but at least part of the incident light passes through the surface and is scattered within the object.

Described herein is a system and method of generating lighting data for a three-dimensional computer generated entity, such as a character, where the generated lighting data incorporates the effects of both self-shadowing and sub-surface scattering. The methods described herein can be performed in real-time as a computer generated entity (such as a character or object) moves within a computer generated scene (e.g. as part of a computer game, computer animation or other interactive experience). The methods described herein may also be used in an artificial intelligence (AI) system to coordinate visibility. Whilst the methods are described as being used in performing lighting calculations in real-time, they may also be used to perform lighting calculations off-line and/or to perform visibility calculations in real-time or offline.

Using the methods described herein, lighting parameters are generated offline and stored in an efficient manner such that they can be used in real-time by a pixel shader or vertex shader within the graphics rendering pipeline to render a three-dimensional entity (e.g. a three-dimensional character or object). The lighting parameters for each pixel or vertex comprise an angular parameter and a vector which define a cone-shaped region for the particular pixel or vertex with the apex of the cone-shaped region at the particular pixel or vertex. Incident light which arrives at the pixel or vertex at an angle which is within the cone-shaped region contributes to the lighting at the pixel or vertex (and hence affects the color of one or more pixels) whereas incident light which arrives at the pixel or vertex at an angle which is outside the cone-shaped region is occluded and therefore does not contribute to the lighting at the pixel or vertex. The vector which defines the cone-shaped region is represented in tangent space, which enables the character's mesh to be transformed or deformed in real-time (e.g. as part of the interactive experience comprising the character).

Figure 2:
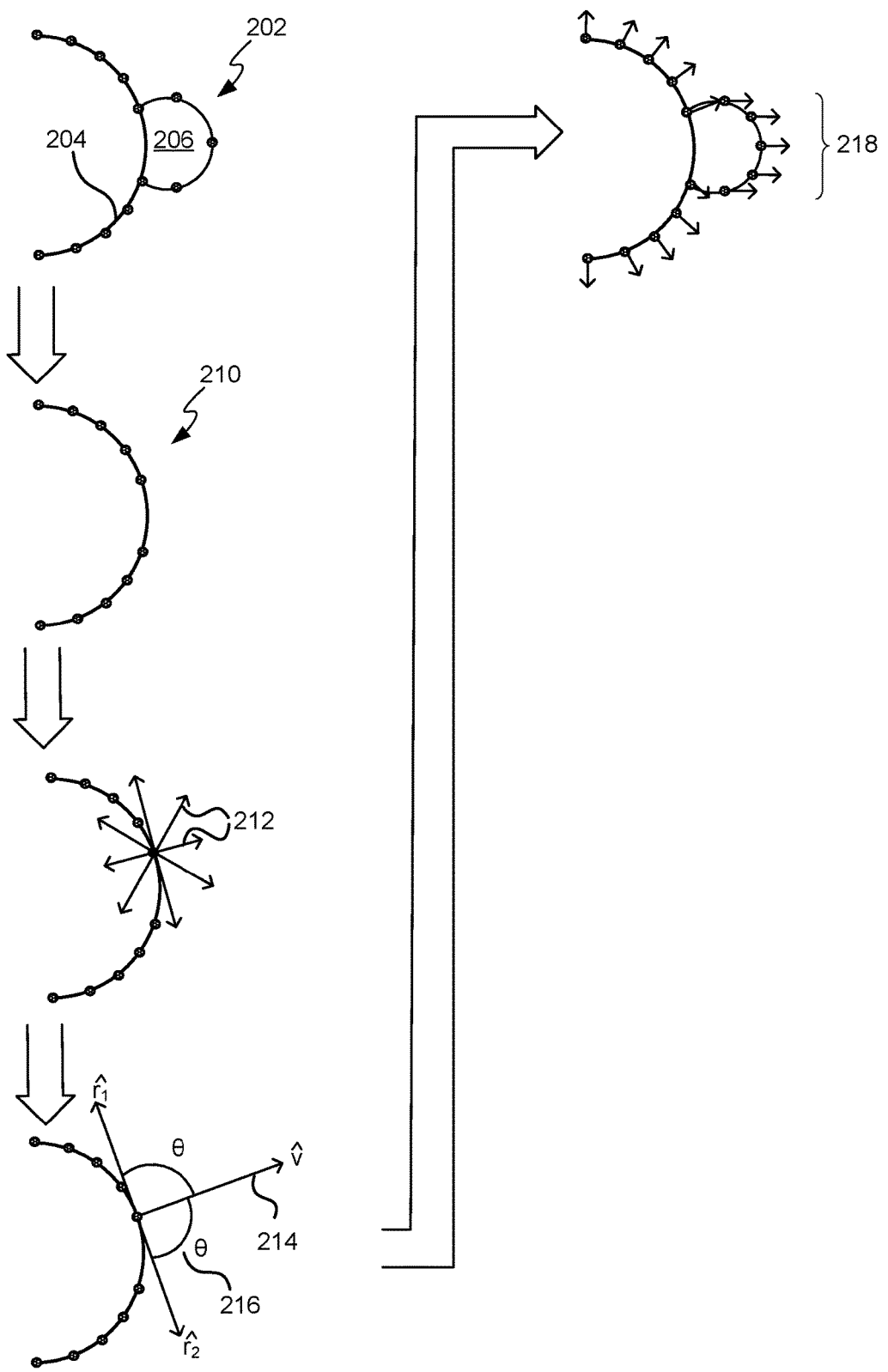
FIG. 2 is a graphical representation of the method of FIG. 1.

FIG. 1 is a flow diagram of an example method of generating lighting data (which may also be referred to as lighting parameters) for a three-dimensional computer generated entity (e.g. a three-dimensional computer generated character) and FIG. 2 shows a graphical representation of this method.

An input to the method of FIG. 1 is a mesh representation of at least a part of the character and FIG. 2 shows a portion of a mesh representation of the head of a character 202 and in particular, the example shown in FIG. 2 shows one side of the head 204 and an ear 206. It will be appreciated that whilst the representation shown in FIG. 2 is in two dimensions, this is by way of example only, and the mesh of the character (or a part thereof) will be a three-dimensional mesh. A mesh representation of a character (or other entity) comprises a plurality of vertices, edges and faces, where edges connect vertices together and faces are defined by a plurality of vertices (and may for example, be triangular).

Having received the mesh representation of the character 202 (block 102), the mesh is simplified by removing vertices from the mesh which are translucent (block 104). The determination of which vertices 208 (or faces defined by a plurality of vertices 208) of the mesh are to be removed (in block 104) may be performed in many different ways and translucency data may be sampled from a translucency map, mask or texture. For example, all vertices which correspond to non-opaque (i.e. translucent) parts of the character may be removed or there may be a threshold which only removes the most translucent parts of the object. In all these examples, vertices having an opacity below a threshold level are removed from the original input mesh to generate a simplified mesh 210 comprising fewer vertices. The differences between the examples described above are in the way that the threshold level and/or the opacity is defined.

Having generated the simplified mesh 210 (in block 104) a plurality of rays 212 are propagated from a vertex in the simplified mesh 210 (block 106). Although FIG. 2 shows the propagation of eight rays, it will be appreciated that in practice a much larger number of rays are propagated (e.g. thousands of rays may be propagated from each vertex). It is then determined which of those propagated rays 212 intersect with the simplified mesh 210 and/or which of those propagated rays 212 do not intersect with the simplified mesh 210 (block 108). In the example shown in FIG. 2, three rays intersect with the simplified mesh and five rays do not.

A cone-shaped region is then defined for the vertex (with the apex of the cone-shaped region being positioned at the vertex) based on (e.g. using) those of the plurality of propagated rays which do not intersect with the simplified mesh 210 (block 110), where the cone is defined in terms of a vector 214, $\hat{v}$, and an angular parameter, which may be the actual angle 216, $\theta$ (which may also be referred to as the 'literal angle') or an abstract angle (as described in more detail below). The vector 214, which may be referred to as the direction of least occlusion (DLO) vector, defines the center line of the cone-shaped region and therefore, as the cone-shaped region has circular symmetry, the DLO vector is the axis of the cone-shaped region. The DLO vector 214 may be determined from those propagated rays which do not intersect with the simplified mesh 210, e.g. by taking a weighted average of those propagated rays which do not intersect with the simplified mesh 210 or by finding a cone-shaped region which best fits those propagated rays which do not intersect with the simplified mesh 210 (e.g. by selecting two rays from those rays that do not intersect with the simplified mesh such that the angle between the two selected rays is a maximum value and then setting the DLO vector at the mid-point of the angle).

Figure 3:
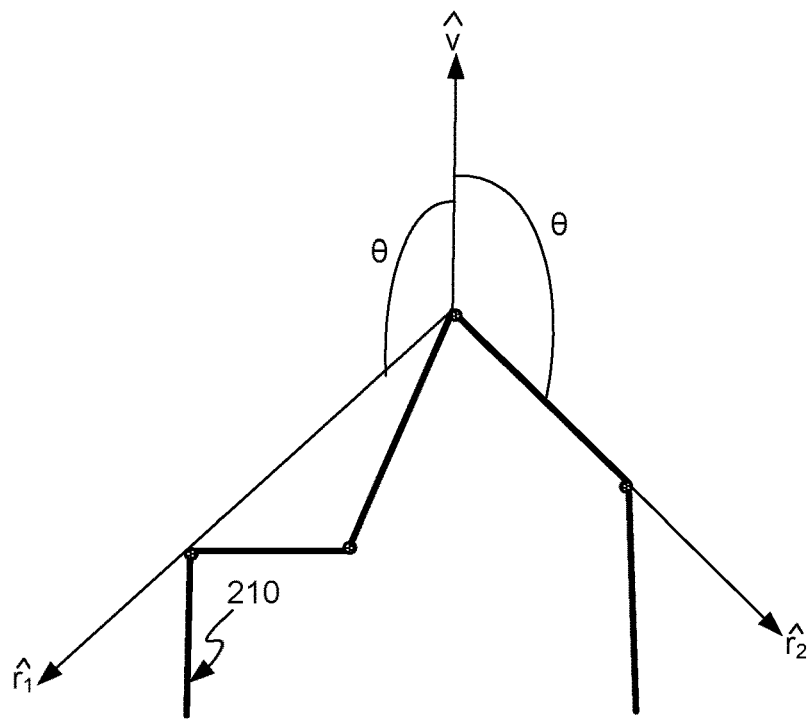
FIG. 3 is a graphical representation of a part of the method of FIG. 1.

The angular parameter, which may be referred to as the DLO angular parameter (or angle, where it refers to the literal angle), defines the aperture of the cone-shaped region, as shown in both FIG. 2 and FIG. 3, which shows a different shaped simplified mesh 210. In examples where the DLO angular parameter is a literal angle (e.g. which is measured in degrees or radians), the angular parameter may be calculated by first calculating the dot product of the ray (from the plurality of propagated rays) at the maximum angle to the DLO vector which does not intersect with the simplified mesh (one of the two rays denoted $\hat{r}_1$ and $\hat{r}_2$ in FIGS. 2 and 3) and the DLO vector $\hat{v}$ (which may be generated using a weighted average or best-fit, as described above) and then calculating the inverse cosine of the result:

$$\theta = \cos^{-1}(\hat{r}_1 \cdot \hat{v}) = \cos^{-1}(\hat{r}_2 \cdot \hat{v})$$

In various examples, however, the DLO angular parameter may be stored as an abstract angle, $\beta$, i.e. as a value in the range −1 to +1 (such that +1 corresponds to 180° and −1 corresponds to 0°), which reduces the complexity of the computations at runtime, where:

$$\beta = (-\hat{r}_1 \cdot \hat{v}) = (-\hat{r}_2 \cdot \hat{v})$$

The direction of the propagated rays $\hat{r}_1$ and $\hat{r}_2$) in the expression above is reversed (prior to performing the dot product) to mimic the direction from which the light will be approaching at runtime.

Using this method (blocks 106-110), a cone-shaped region is defined for each vertex in the simplified mesh 210 and the calculations may be performed in series (as shown in FIG. 2 by the arrow from block 110 to block 106) and/or in parallel (e.g. for all of the vertices in parallel).

Having defined a cone-shaped region of least occlusion (CLO) for each vertex in the simplified mesh, a cone-shaped region of least occlusion is defined for each vertex in the original received mesh 202 by interpolating the angular parameters and vectors for each vertex in the simplified mesh 210 (block 112). Any suitable form of interpolation may be used, such as nearest-neighbor interpolation or linear proximity interpolation (which may yield smoother results with less artifacts than nearest-neighbor interpolation). In the example shown in FIG. 2, many of the vertices in the original received mesh 202 correspond exactly to one of the vertices in the simplified mesh 210; however, for each of the vertices which were removed because of their translucency (in block 104), a cone-shaped region of least occlusion is determined by interpolating the angular parameters and vectors for proximate vertices in the simplified mesh 210 (in block 112).

As shown in the example of FIG. 2, the interpolation (in block 112) will result in a plurality of vertices having DLO vectors that are not perpendicular to the surface of the character at the vertex, except for vertices that have neighboring geometric rotational symmetry (where neighboring geometry is defined as all adjoined vertices/faces that can be expanded out to a point that lies on its convex hull). Furthermore, the interpolation (in block 112) may result in a plurality of proximate vertices (as indicated by bracket 218 in FIG. 2) having DLO vectors which are parallel to each other, irrespective of the actual topology of the character at or between the vertices.

Having generated the per-vertex data (in block 112), i.e. the vector and the angular parameter for each vertex in the received mesh which defines a cone-shaped region for each vertex in the received mesh, this data (which may collectively be referred to as the lighting data) is output (block 114). The data may be output for further processing or may be output to a data store (i.e. the lighting data may be stored).

The output data (in block 114) comprises four floating point numbers per vertex, three of which represent the DLO vector and one of which represents the DLO angular parameter (i.e. the literal or abstract angle). These four floating point numbers may, for example, be stored as a color value (e.g. RGBA) or two UV sets (i.e. two texture coordinates). These two formats (i.e. color and UV sets) are data formats which can be handled by the graphics rendering pipeline in a GPU (e.g. by a vertex shader) and so this enables the lighting data to be used by the GPU and the lighting parameters for each vertex to be computed in parallel (as described in more detail below).

The DLO vector may be represented in tangent space (rather than world space) so that the mesh can be transformed or deformed within the interactive space. In various examples, the generation of the lighting data (as described above) may be performed on the input mesh (as received in block 102) in its most extended (e.g. most spaced or most stretched) position. For example, for a mesh of a humanoid character, the lighting data may be calculated using the mesh posed into a position with all limbs stretched away from the center of the character (e.g. as if the character was performing a star jump).

As noted above, by using an abstract angle (i.e. a value in the range [−1, +1]) instead of the literal angle (in the range of 0-180°), the complexity of the calculations performed when rendering the character is reduced (and hence this reduces the computing power required), as described in more detail below.

Figure 4:
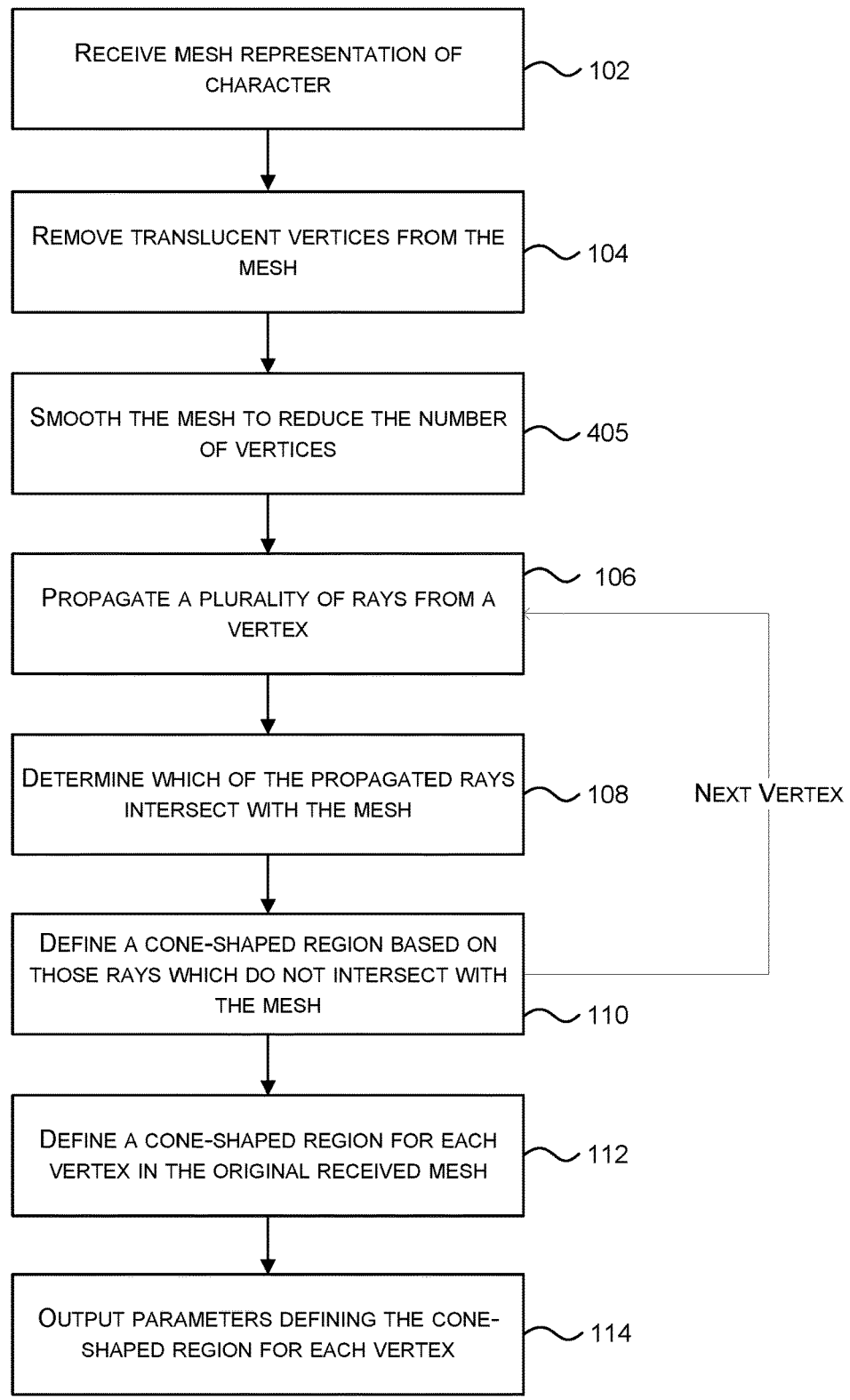
FIG. 4 is a flow diagram of another example method of generating lighting data for a three-dimensional computer generated character.
Figure 5:
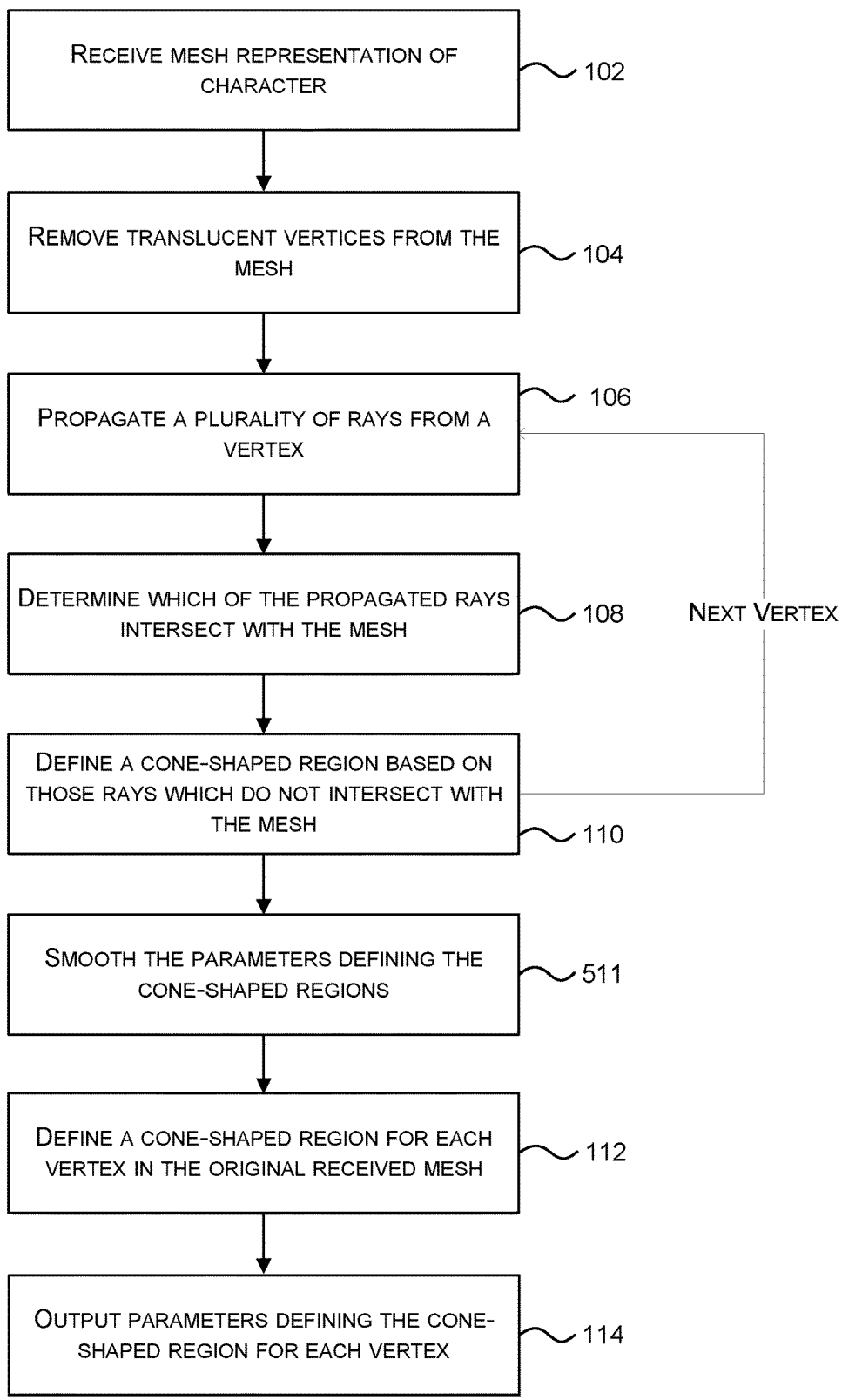
FIG. 5 is a flow diagram of a further example method of generating lighting data for a three-dimensional computer generated character.

FIGS. 4 and 5 show flow diagrams of two further example methods of generating lighting data (or lighting parameters) for a three-dimensional computer generated character and both of these methods are variations on the method shown in FIG. 1 and described above. The methods of FIGS. 4 and 5 both involve a smoothing operation, which reduces sharp transitions in the direction of the DLO vector between adjacent vertices in the original input mesh 202; however, the two methods implement the smoothing in different ways.

Figure 6:
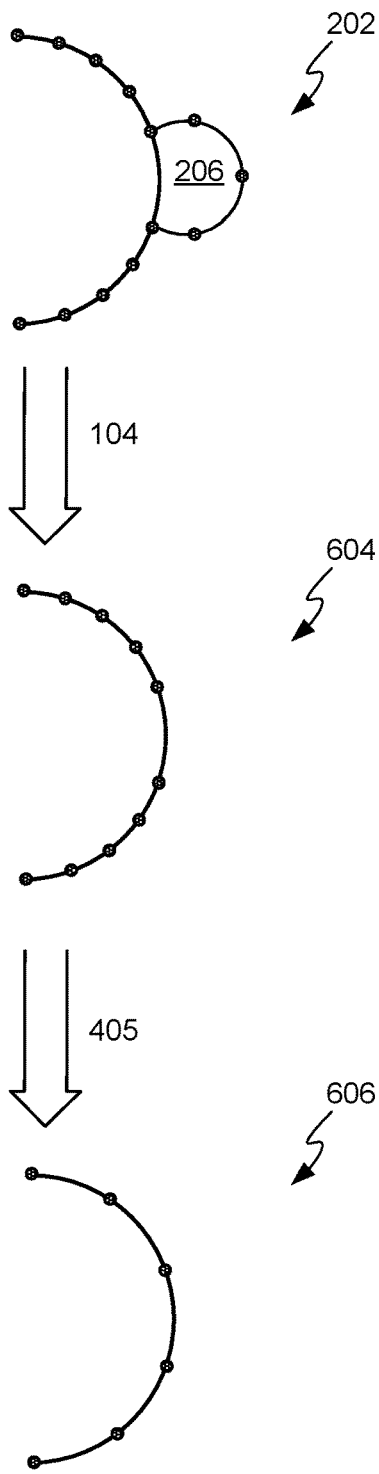
FIG. 6 is a graphical representation of the method of FIG. 4.

In the method shown in FIG. 4, the smoothing occurs prior the propagation of rays (in block 106). As shown in FIG. 4, having removed the translucent parts of the input mesh 202 to generate the simplified mesh (in block 104), the simplified mesh is further simplified by smoothing the mesh to further reduce the number of vertices and faces (block 405), where, as described above, faces are defined by vertices (e.g. triangular faces defined by three vertices). This two-stage simplification is shown graphically in FIG. 6. As shown in FIG. 6, the input mesh 202 is first simplified (in block 104) to remove the vertices which are translucent, (e.g. those on the ear 206) to generate a first simplified mesh 604 and then that mesh 604 is further simplified by reducing the number of vertices (in block 405) to generate a second simplified mesh 606. This simplification of the mesh (in block 405) may comprise reducing the vertex density in a uniform manner across the entire mesh or alternatively, those parts of the mesh which are more translucent (e.g. as determined from translucency data sampled from the translucency texture) may be smoothed more than other parts of the mesh which are less translucent. Cone-shaped regions are then defined for each vertex in this second simplified mesh 606 (in blocks 106-110) and then the parameters defining the cone-shaped regions are interpolated to define a cone-shaped region for each of the vertices in the original mesh 202 (in block 112).

In contrast, in the method shown in FIG. 5, the smoothing (block 511) occurs to the cone parameters (e.g. the vectors and angles) after a cone has been defined for each vertex in the simplified mesh 210 (in block 110) and prior to the interpolation (in block 112). In a further example the smoothing (in block 511) may be performed after the interpolation (e.g. such that block 511 comes after block 112 in the flow diagram); however, whilst this would give almost exactly the same result, there are more vertices to compute and hence the smoothing is more computationally intensive and will take longer to perform. In various examples, this smoothing (in block 511) may be implemented by taking the vector and angular parameter for each vertex and then smoothing the values using a Laplace function.

Both the method of FIG. 4 and the method of FIG. 5 achieve the same effect, i.e. the removal of sharp transitions in the direction of the DLO vector and the DLO angle, however the method of FIG. 4 is more efficient (i.e. it requires less computation power because there are less vertices to iterate over) and generates a more accurate answer (i.e. the approximation generated using the method of FIG. 4 is closer to the result that would be achieved using ray tracing, this because the method of FIG. 5 cannot remove translucent parts of the mesh from the calculation as well as the method of FIG. 4 and furthermore the method of FIG. 4 can show contrasts between areas of the mesh that are very translucent which border areas that are very opaque).

In a further variation of the methods described above, and in particular, of the method shown in FIG. 4, the method may comprise smoothing the mesh to reduce the number of vertices (in block 405) but the operation of removing translucent parts of the mesh (i.e. translucent vertices) may be omitted (i.e. block 104 may be omitted).

Having generated the lighting data for each vertex in the original input mesh 202, in various examples, the data may be manually or automatically modified to further adjust the self-shadowing effects when the character is rendered. In various examples the lighting data (as generated using one of the methods described above) may be automatically modified by using the translucency data (e.g. as sampled from the translucency texture) to bias the angular parameter (e.g. the abstract angle), e.g. such that in areas which are more translucent, the angular parameter may be biased towards a value of one.

Whilst the data output from the methods of FIGS. 1, 4 and 5 is described as being per-vertex, in various examples the per-vertex data may be further interpolated to generate lighting data for each pixel and this data may be stored in a texture. A texture is another data format which can be handled by the graphics rendering pipeline (e.g. by a pixel shader) and so this enables the lighting data to be used by the GPU and the lighting parameters for each pixel to be computed in parallel (as described in more detail below). The texture provides additional detail and in many examples this is not required because the lighting data is providing an approximation to the actual result (e.g. as could be generated using ray tracing). In various applications, however, a texture may be used to generate additional detail for a low resolution mesh and this may be a more efficient implementation (e.g. because the low resolution mesh requires less computation to process at runtime).

Having generated per-vertex or per-pixel lighting data using the method of any of FIGS. 1, 4 and 5, this data may be stored (as described above) and then subsequently used when rendering the character to determine whether a ray of light is incident on a point on the character (e.g. on a pixel or vertex) and hence used to determine the color of one or more pixels.

Figure 7:
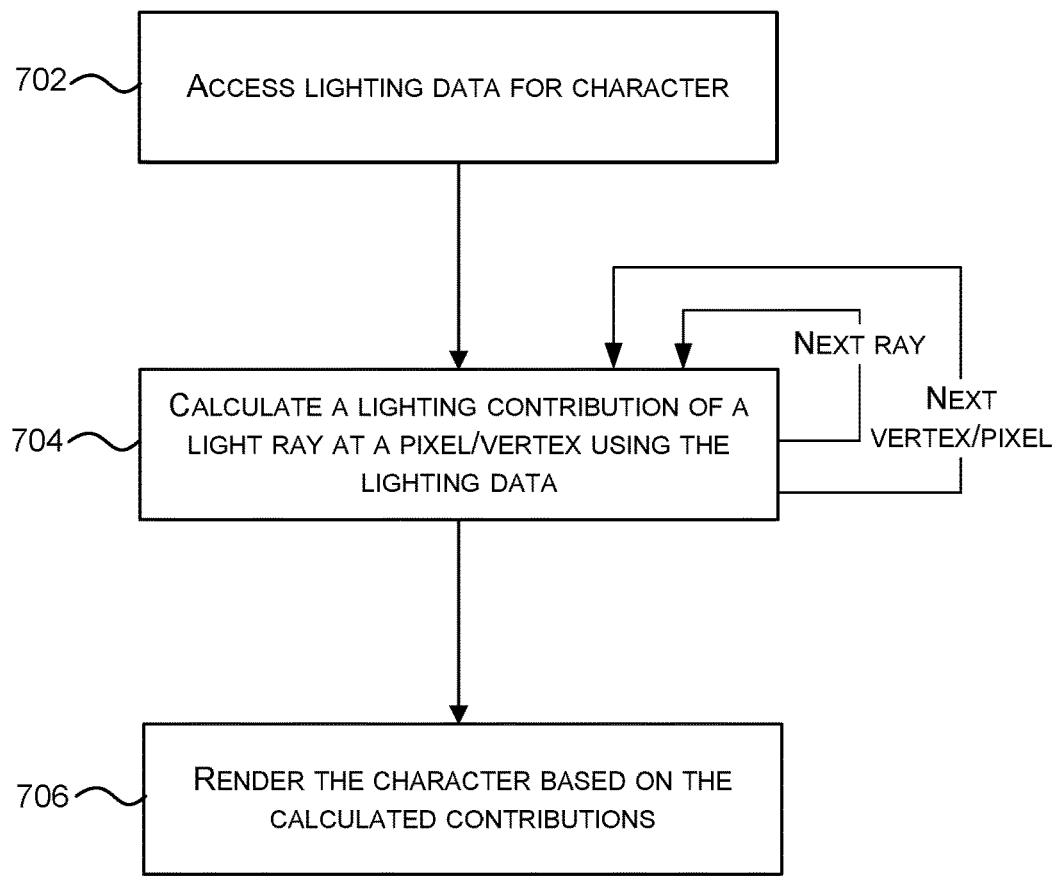
FIG. 7 is a flow diagram of an example method of rendering a three-dimensional computer generated character using the lighting data generated using the method of any of FIGS. 1, 4 and 5.

FIG. 7 is a flow diagram of an example method of rendering a three-dimensional computer generated entity (e.g. a character) using the lighting data generated using the method of any of FIGS. 1, 4 and 5. The method comprises accessing the lighting data for at least a part of the computer generated entity, such as a character (block 702), where, as described above, the lighting data defines a cone in terms of an angular parameter and a vector for each vertex or pixel. As described above, if the lighting data is defined per-pixel then the method of FIG. 7 may be implemented within a pixel shader and the lighting data may be accessed from a texture lookup and if the lighting data is defined per-vertex then the method of FIG. 7 may be implemented within a vertex shader (and then the result is interpolated across the face of the polygon).

Figure 8:
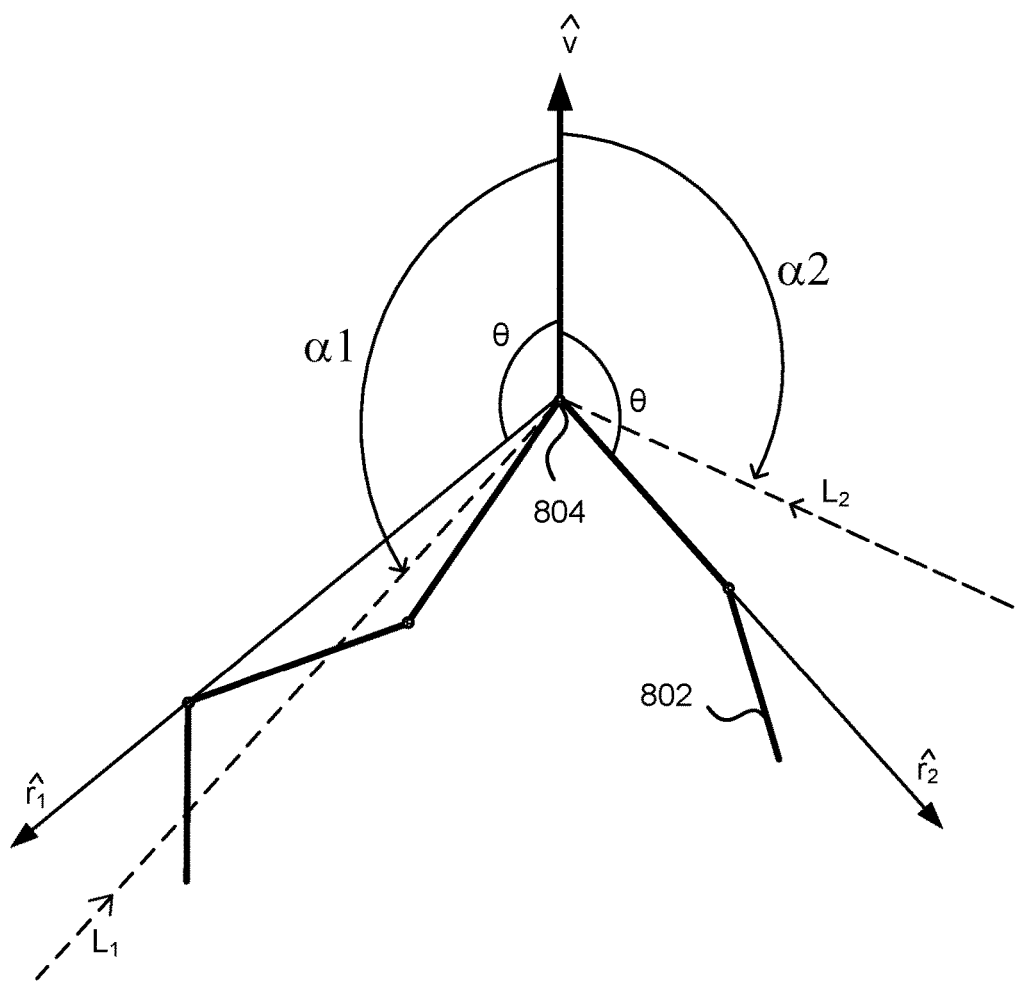
FIG. 8 is a graphical representation of the method of FIG. 7.

The accessed lighting data is then used to calculate a lighting contribution of each light ray incident on the character at a pixel or vertex (block 704). This calculation (in block 704) is dependent upon a direction of the incident ray relative to the cone-shaped region and can be described with reference to FIG. 8. FIG. 8 is a schematic diagram showing a part of a mesh for a character 802 which includes a vertex 804. The DLO vector, $\hat{v}$, and DLO angular parameter, θ, (which in the example shown in FIG. 8 is the literal angle) for the vertex 804 are shown in addition to two light rays, $L_1$ and $L_2$. The lighting contribution of each of these rays, $L_1$ and $L_2$, on the vertex 804 is dependent upon the incident angle of each ray relative to the cone-shaped region. The cone-shaped region is defined by the lighting data and in examples where the DLO vector is defined in tangent space, the DLO vector is first transformed into world space, before the lighting contribution is determined.

In various examples the lighting contribution for a combination of a ray and a vertex (or pixel) may be a binary value which indicates whether the ray lights the vertex (or pixel) or not (e.g. 1 indicates that the ray lights the vertex or pixel and 0 indicates that the ray does not light the vertex or pixel). It can be seen in FIG. 8, that the first light ray, $L_1$, arrives at the vertex 804 from outside the cone-shaped region because the angle between the light ray and the DLO vector is greater than the DLO angle, i.e. $\alpha_1 > \theta$, and hence that ray does not contribute to the lighting at the vertex 804. In contrast, the second light ray, $L_2$, arrives at the vertex 804 from within the cone-shaped region because the angle between the light ray and the DLO vector is less than the DLO angle, i.e. $\alpha_2 < \theta$, and hence that ray does contribute to the lighting at the vertex 804.

If the DLO angular parameters are the literal angles, denoted θ, (i.e. they are stored in degrees or radians), then the angle between the light ray and the DLO vector, α, can be calculated by first calculating the dot product of the inversed light ray and the DLO vector $\hat{v}$ as normalized vectors and then calculating the inverse cosine of the result, i.e.

$\alpha_1 = \cos^{-1}(\widehat{-L_1} \cdot \hat{v})$ $\alpha_2 = \cos^{-1}(\widehat{-L_2} \cdot \hat{v})$ The binary lighting contribution for a light ray (as calculated in block 704) may then be given by $$\text{Lighting contribution} = \begin{cases} 1 & \text{if } \alpha < \theta \\ 0 & \text{if } \alpha \geq \theta \end{cases}$$

If, however, the DLO angular values are the abstract angles, denoted β, (i.e. they are stored as a value in the range [−1,+1] as described above), then the computation of the lighting contribution (in block 704) can be performed in a more efficient manner (i.e. the amount of processing power required to perform the computation is reduced). In particular, the computation to calculate the inverse cosine (which is computationally intensive) is avoided and so is the operation to inverse the light ray. Instead, the result of calculating the dot product of the light ray and the DLO vector $\hat{v}$ as normalized vectors can be compared directly to the abstract angle in the range [−1,+1], i.e.:

$\gamma_1 = (\widehat{L_1} \cdot \hat{v})$ $\gamma_2 = (\widehat{L_2} \cdot \hat{v})$ In such examples, the binary lighting contribution for the light ray (as calculated in block 704) may then be given by $$\text{Lighting contribution} = \begin{cases} 1 & \text{if } \gamma < \beta \\ 0 & \text{if } \gamma \geq \beta \end{cases}$$

Having determined the lighting contribution for each vertex or pixel and each incident light ray (e.g. by repeating block 704 and/or by performing multiple calculations in parallel), the character may be rendered using the calculated lighting contributions (block 706).

In the method of FIG. 7 described above, the binary decision comparing either α to θ or γ to β may result in a harsh unlit/lit contrast on the surface of the character (e.g. on the surface of the mesh). In a variation of the methods described above for calculating the lighting contribution, linear interpolation may be used. This has the effect that the lighting contribution is no longer a binary value but is instead a value in the range [0, 1]. This gives the impression to the viewer of the interactive experience of a larger light source, which creates a shadowing effect with some level of fall off between the lit and unlit areas, as represented graphically in FIG. 9.

Figure 9:
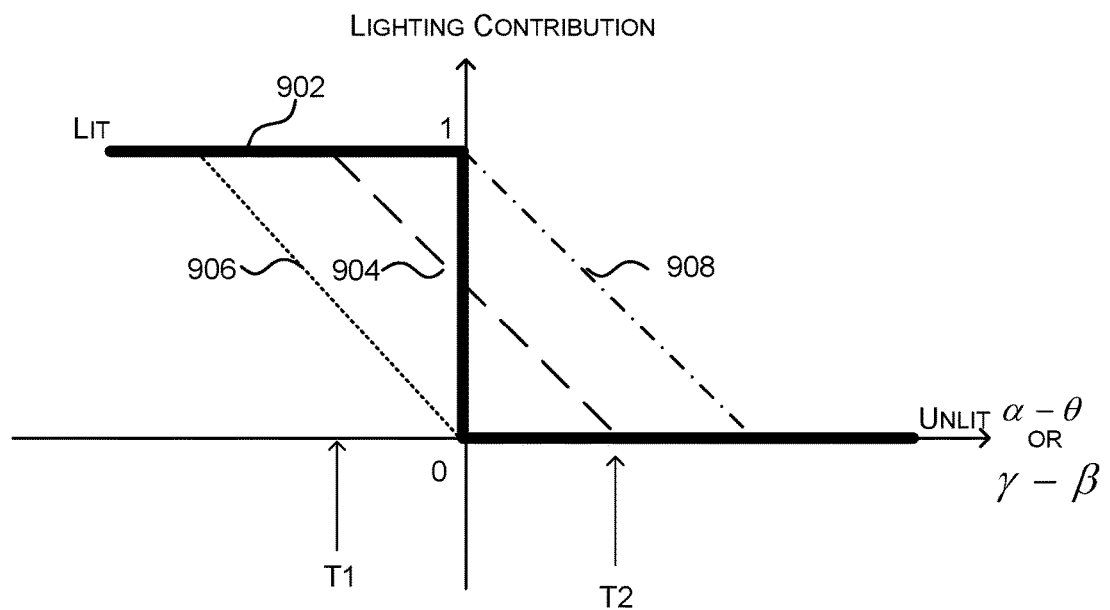
FIG. 9 is a graph showing example values of lighting contribution that may be calculated using the method of FIG. 7.

In the graph of FIG. 9, the solid line 902 shows the effect of the calculations described above resulting in a binary value for the lighting contribution. There is a sharp transition at a point (i.e. when α=θ or γ=β) between the lit region (where the lighting contribution=1) and the unlit region (where the lighting contribution=0). In contrast, the dashed line 904 shows the use of linear interpolation which provides a fall off between the lit and unlit regions. This fall off may be implemented as follows:

$\gamma = (\hat{l} \cdot \hat{v})$ $$\text{Lighting contribution} = \text{clamp}\left(\frac{\max(0, (\beta - \gamma) + (F/2) + f)}{F}\right)$$

This has the effect of clamping the lighting contribution in the range [0, 1]. Whilst this equation is shown in relation to use of abstract angles, it may also be used where the literal angle is used (e.g. by replacing γ and β by α and θ respectively and using different values of F and f). The two parameters F (which is always greater than zero) and f control the slope of the fall off and the position of the fall off compared to the hard cut off at β−γ=0, e.g. such that it can be adjusted towards the lit area (e.g. to the left in the graph of FIG. 9, as indicated by the dotted line 906) or towards the unlit area (e.g. to the right in the graph of FIG. 9, as indicated by the dashed and dotted line 908). In various examples the values of F and f may be fixed, however in other examples a mask or function may be used to vary or bias F and f at runtime (e.g. based on translucency data sampled from the translucency texture), for example to achieve a varying fall off across the surface.

As shown in FIG. 9 and defined by the equation above, if γ−β (or α−θ where literal angles are used) is less than a first threshold, T1, then the lighting contribution is 1 and where γ−β (or α−θ where literal angles are used) is more than a second threshold, T2 (which is higher than the first threshold), then the lighting contribution is 0. Where γ−β (or α−θ where literal angles are used) is between the two thresholds, T1 and T2, then the lighting contribution is between 1 and 0.

In examples where the lighting contribution is not a binary value but instead is a value in the range [0, 1], in addition to eliminating a harsh area between the lit and unlit areas (as if the light was casting a very crisp shadow), it also appears (in the rendered character) as if some of the light is hitting the surface of the character through the volume of the object (e.g. if the interpolation is not offset, is offset to the left or is offset to the right in FIG. 9 less than as indicated by the dotted line 906). This creates a sub-surface scattering effect in the rendered character and adds to the effect already created due to the simplification of the mesh to remove the translucent vertices (as described above), e.g. by giving the impression that the surface has a consistent translucency).

In various examples the non-binary lighting contribution may be used with lighting data which is generated using a modified version of any of the methods described above, e.g. a version of any of those methods in which the mesh is not simplified by removing translucent parts of the character (e.g. block 104 is omitted from any of the methods described above). If fixed values of F and f are used the result provides consistent sub-surface scattering effects across the mesh; however, by varying F and f (as described above), the quality of the effects is improved.

In various examples, the sub-surface scattering effect in the rendered character may be enhanced by increasing the DLO angular parameter when defining the cone-shaped region (e.g. in block 110 of any of FIGS. 1, 4 and 5) such that it is larger than half of the maximum literal or abstract angle between two propagated rays which do not intersect with the simplified mesh 210 (e.g. by a pre-defined, fixed amount, such as 5% larger, or an amount which varies across the mesh according to translucency data sampled from the translucency texture). This technique may be used in combination with the fall off method described with reference to FIG. 9 or may be used without implementing a fall off in the lighting contribution value (i.e. where the lighting contribution is a binary value).

In various examples when rendering a character, the lighting contribution (as calculated using the methods described above) may be applied in different ways depending upon whether the light source (i.e. the light rays) are coming from in front of or behind the triangle being rendered. In such examples, a test may be performed in the vertex or pixel shader to determine where the light ray is coming from relative to the triangle and then the lighting contribution may be applied in different ways. For example, if the light ray is coming from behind the triangle and the surface is translucent (which may be determined or assumed), the color of blood may be added to the final color if rendering skin to further enhance the visual effect of sub-surface scattering.

Figure 10:
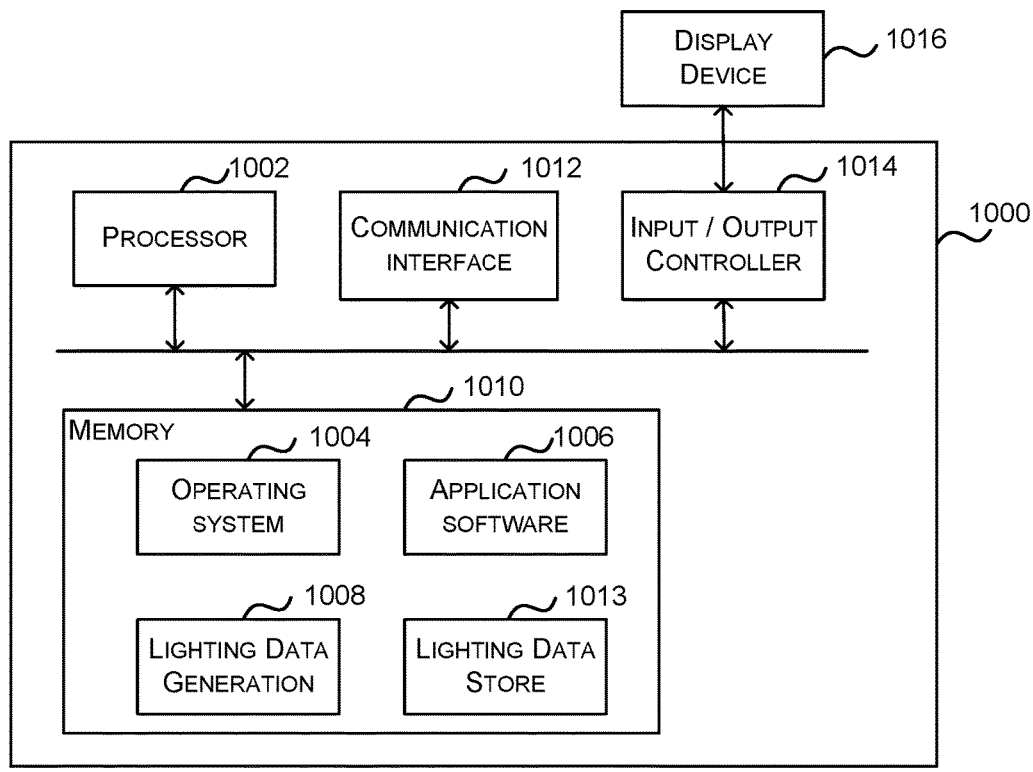
FIG. 10 illustrates a first exemplary computing-based device in which embodiments of the methods described herein are implemented.
Figure 11:
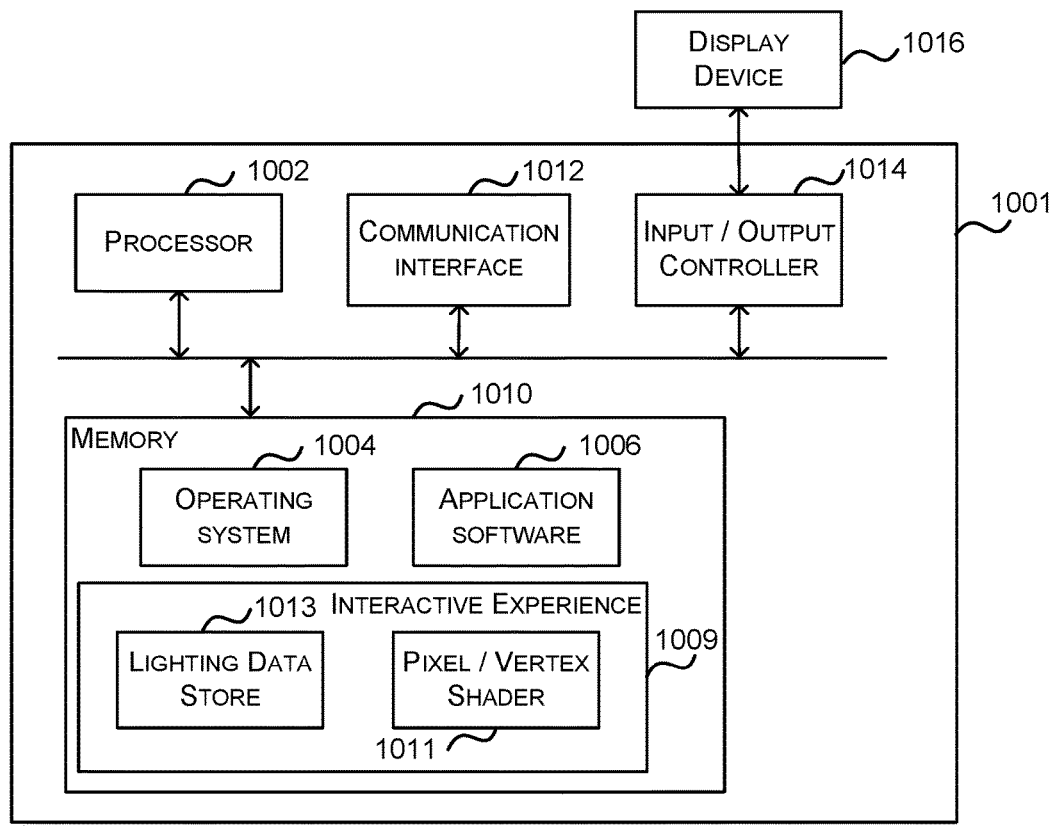
FIG. 11 illustrates a second exemplary computing-based device in which embodiments of the methods described herein are implemented.

FIGS. 10 and 11 illustrates various components of exemplary computing-based devices 1000, 1001 which are implemented as any form of a computing and/or electronic device, and in which embodiments of the methods described herein may be implemented.

Computing-based device 1000, as shown in FIG. 10, comprises one or more processors 1002 which are microprocessors, controllers or any other suitable type of processors for processing computer executable instructions to control the operation of the device in order to generate the lighting data as described above, e.g. using the method of any of FIGS. 1, 4 and 5. Computing-based device 1001, as shown in FIG. 11, comprises one or more processors 1002 which are microprocessors, controllers or any other suitable type of processors for processing computer executable instructions to control the operation of the device in order to render a character using the lighting data as described above, e.g. using the method of FIG. 7.

In some examples, for example where a system on a chip architecture is used, the processors 1002 include one or more fixed function blocks (also referred to as accelerators) which implement a part of the method of generating or using the lighting data in hardware (rather than software or firmware). Platform software comprising an operating system 1004 or any other suitable platform software is provided at the computing-based device 1000, 1001 to enable application software 1006 to be executed on the device.

The application software on the computing-based device 1000 may include a lighting data generation module 1008 comprising computer executable instructions to control the operation of the device to generate the lighting data as described above (e.g. using the method of any of FIGS. 1, 4 and 5). Alternatively, or in addition, the method of generating the lighting data described herein may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The application software on the computing-based device 1001 may include an interactive software experience 1009 (e.g. a computer game or computer animation program). This interactive software experience 1009 may include a pixel/vertex shader program 1011 for execution by pixel/vertex shader hardware within the graphics pipeline in a processor 1002 (which in this example may be a GPU). The pixel/vertex shader program 1011 comprises computer executable instructions to control the operation of the device to use the lighting data to render a character as described above (e.g. using the method of FIG. 7). Alternatively, or in addition, the method of using the lighting data to render a character described herein may be performed, at least in part, by one or more hardware logic components (e.g. one of the examples listed above).

The computer executable instructions are provided using any computer-readable media that is accessible by computing based device 1000, 1001. Computer-readable media includes, for example, computer storage media such as memory 1010 and communications media. Computer storage media, such as memory 1010, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1010) is shown within the computing-based device 1000, 1001 it will be appreciated that the storage is, in some examples, distributed or located remotely and accessed via a network or other communication link (e.g. using communication interface 1012).

The memory 1010 may be configured to store the lighting data 1013 which is generated by the lighting data generation module 1012 in the device 1000 and used by the pixel/vertex shader program 1011 in the device 1001. In the computing-based device 1001, this lighting data store 1013 may be part of the interactive software experience 1009 or may be stored separately.

The computing-based device 1000, 1001 may also comprises an input/output controller 1014 arranged to output display information to a display device 1016 which may be separate from or integral to the computing-based device 1000, 1001. The display information may provide a graphical user interface (e.g. which displays the rendered character in an interactive experience, such as a computer game or animation). The input/output controller 1014 may also be arranged to receive and process input from one or more devices, such as a user input device (e.g. a mouse, keyboard, camera, microphone or other sensor). In some examples the user input device detects voice input, user gestures or other user actions and provides a natural user interface (NUI). This user input may, for example, be used to control the rendered character (in device 1001) or manually edit the lighting data (in device 1000). In an embodiment the display device 1016 also acts as the user input device if it is a touch sensitive display device. The input/output controller 1014 may also output data to devices other than the display device 1016.

Any of the input/output controller 1014, display device 1016 and any user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in a computing device as shown in FIG. 10 or FIG. 11, the system described is provided as an example and not a limitation. As those skilled in the art will appreciate, the present examples are suitable for application in a variety of different types of computing systems. Furthermore, although the examples are described above in relation to a mesh of a character, it will be appreciated that this character may take any form and may be a humanoid character or a non-humanoid character or the mesh may be of any other entity (e.g. a rock, a plant, a building, etc.).

A first further example provides a computer implemented method of automatically generating lighting data for a three-dimensional computer generated entity, the method comprising: receiving a mesh representation of at least a part of the entity; simplifying the mesh by removing vertices from the mesh; for each vertex in the simplified mesh, propagating a plurality of rays from the vertex and defining a cone-shaped region having an apex at the vertex using those of the plurality of rays that do not intersect with the simplified mesh, wherein the cone-shaped region is defined in terms of a vector and an angular parameter; calculating an angular parameter and a vector for each vertex in the received mesh by interpolating the angular parameters and vectors for each vertex in the simplified mesh; and outputting lighting data, the lighting data comprising the angular parameter and vector for each vertex in the received mesh.

Alternatively or in addition to the other examples described herein, the first further example may include any combination of the following features:

The entity may be a character.

Outputting the lighting data may comprise: storing the lighting data in a data structure for subsequent use when rendering the character.

The lighting data may be stored as a color value for each vertex or two UV sets for each vertex.

Simplifying the mesh by removing vertices from the mesh may comprise: simplifying the mesh by removing vertices from the mesh having an opacity below a threshold level.

Removing vertices from the mesh having an opacity below a threshold level may comprise: removing vertices from the mesh that are translucent.

Simplifying the mesh by removing vertices from the mesh may further comprise: smoothing the mesh to eliminate a plurality of vertices and faces.

The vector in the lighting data may be defined in tangent space.

The angular parameter may be an abstract angle having a value between −1 and +1.

Defining a cone-shaped region using those of the plurality of rays that do not intersect with the simplified mesh may comprise: calculating a vector by either averaging the propagated rays which do not intersect with the simplified mesh or selecting two of the propagated rays which do not intersect with the simplified mesh which are separated by a maximum angle and setting the vector at a mid-point between the two selected rays; and calculating an angular parameter based on a dot product of the vector and a selected one of the propagated light rays at a maximum angle to the vector that does not intersect with the simplified mesh.

The method may further comprise: smoothing parameters defining the cone-shaped region for each vertex across the simplified mesh prior to interpolating the angular parameters and vectors for each vertex.

Defining a cone-shaped region using those of the plurality of rays that do not intersect with the simplified mesh may comprise: identifying those rays from the plurality of rays that intersect with the simplified mesh; and defining a cone-shaped region that encompasses all the rays that are not identified as intersecting with the simplified mesh.

A second further example provides a computer implemented method of rendering a three-dimensional computer generated entity, the method comprising: accessing lighting data for at least a part of the computer generated entity, the lighting data defining a cone-shaped region in terms of an angular parameter and a vector for each vertex or pixel; and for each light ray incident on a vertex or pixel of the entity, calculating a lighting contribution of the ray at the vertex or pixel dependent upon a position of the incident ray relative to the cone-shaped region; and rendering the entity using the calculated lighting contributions, wherein the lighting data is generated by: receiving a mesh representation of at least a part of the entity; simplifying the mesh by removing vertices from the mesh; for each vertex in the simplified mesh, propagating a plurality of rays from the vertex and defining a cone-shaped region having an apex at the vertex using those of the plurality of rays that do not intersect with the simplified mesh, wherein the cone-shaped region is defined in terms of a vector and an angular parameter; calculating an angular parameter and a vector for each vertex in the received mesh by interpolating the angular parameters and vectors for each vertex in the simplified mesh; and outputting lighting data, the lighting data comprising the angular parameter and vector for each vertex in the received mesh.

Alternatively or in addition to the other examples described herein, the second further example may include any combination of the following features:

The entity may be a character.

The vector for each vertex or pixel may be defined in tangent space and the method may further comprise converting the vector to world space prior to calculating a lighting contribution of the ray at the vertex or pixel dependent upon a position of the incident ray relative to the cone.

Calculating a lighting contribution of the ray at the vertex or pixel dependent upon a position of the incident ray relative to the cone-shaped region may comprise: calculating an angle between the incident ray and the vector defining the cone; and determining whether the angle between the incident ray and the vector defining the cone-shaped region exceeds the angular parameter defining the cone-shaped region.

The method may further comprise: in response to determining that the angle between the incident light ray and the vector defining the cone-shaped region exceeds the angular parameter defining the cone, setting the lighting contribution to indicate that the incident ray does not light the vertex or pixel; and in response to determining that the angle between the incident light ray and the vector defining the cone-shaped region does not exceed the angular parameter defining the cone-shaped region, setting the lighting contribution to indicate that the incident ray does light the vertex or pixel.

Each angular parameter in the lighting data may be represented as a value between −1 and +1 and calculating a lighting contribution of the ray at the vertex or pixel dependent upon a position of the incident ray relative to the cone may comprise: computing a dot product of a normalized version of the incident light ray and the vector defining the cone-shaped region, wherein the vector defining the cone-shaped region is normalized; and determining whether the computed dot product exceeds the angular parameter defining the cone-shaped region.

Each angular parameter in the lighting data may be represented as a value between −1 and +1 and calculating a lighting contribution of the incident light ray at the vertex or pixel dependent upon a position of the incident light ray relative to the cone-shaped region may comprise: computing a dot product of a normalized version of the incident light ray and the vector defining the cone-shaped region, wherein the vector defining the cone-shaped region is normalized; subtracting the computed dot product from the angular parameter defining the cone-shaped region to generate a difference value; in response to generating a difference value that does not exceed a first difference threshold, setting the lighting contribution to indicate that the incident ray does light the vertex or pixel; in response to generating a difference value that exceeds a second difference threshold, wherein the second difference threshold is higher than the first difference threshold, setting the lighting contribution to indicate that the incident ray does not light the vertex or pixel; and in response to generating a difference value between the first and second difference thresholds, setting the lighting contribution to indicate that the incident ray partially lights the vertex or pixel.

Setting the lighting contribution to indicate that the incident ray partially lights the vertex or pixel may comprise: generating a lighting contribution value by linearly interpolating between a first lighting contribution value at the first difference threshold and a second lighting contribution value at the second difference threshold, wherein the first lighting contribution value indicates that the incident ray does light the vertex or pixel and the second lighting contribution value indicates that the incident ray does not light the vertex or pixel.

A third further example provides a computing device comprising: a processor; and a memory arranged to store device executable instructions that, when executed by the processor, cause the processor to: receive a mesh representation of at least a part of a computer-generated entity; simplify the mesh by removing vertices from the mesh; for each vertex in the simplified mesh, propagate a plurality of rays from the vertex and defining a cone-shaped region using those of the plurality of rays that do not intersect with the simplified mesh, wherein the cone-shaped region is defined in terms of a vector and an angular parameter; calculate an angular parameter and a vector for each vertex in the received mesh by interpolating the angular parameters and vectors for each vertex in the simplified mesh; and store lighting data in a lighting data store in the memory, the lighting data comprising the angular parameter and vector for each vertex in the received mesh.

Alternatively or in addition to the other examples described herein, the third further example may include any combination of the following features:

The entity may be a character.

The computing device may further comprise a GPU and wherein the GPU is arranged to: access the stored lighting data for at least a part of the computer-generated entity; and for each light ray incident on a vertex or pixel of the entity, calculate a lighting contribution of the ray at the vertex or pixel dependent upon a position of the incident ray relative to a cone-shaped region defined by the lighting data for the vertex or pixel; and render the entity using the calculated lighting contributions.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computer implemented method of automatically generating lighting data for a three-dimensional computer generated entity, the method comprising:
   receiving a mesh representation of at least a part of the three-dimensional computer generated entity;
   simplifying the mesh by removing vertices from the mesh;
   for each vertex in the simplified mesh determining whether the vertex is blocked by propagating a plurality of rays from the vertex and defining a cone-shaped region having an apex at the vertex using those of the propagated plurality of rays that do not intersect with the simplified mesh, wherein the cone-shaped region is defined in terms of a vector and an angular parameter;
   calculating an interpolated angular parameter and an interpolated vector for each vertex in the received mesh by interpolating the angular parameters and vectors for each vertex in the simplified mesh; and
   outputting lighting data, the lighting data comprising the angular parameter and vector for each vertex in the received mesh.

2. The method according to claim 1, wherein outputting the lighting data comprises:
   storing the lighting data in a data structure for subsequent use when rendering the three-dimensional computer generated entity.

3. The method according to claim 2, wherein the lighting data is stored as a color value for each vertex or two UV sets for each vertex.

4. The method according to claim 1, wherein simplifying the mesh by removing vertices from the mesh comprises:
    simplifying the mesh by removing vertices from the mesh having an opacity below a threshold level.

5. The method according to claim 4, wherein removing vertices from the mesh having an opacity below a threshold level comprises:
    removing vertices from the mesh that are translucent.

6. The method according to claim 4, wherein simplifying the mesh by removing vertices from the mesh further comprises:
    smoothing the mesh to eliminate a plurality of vertices and faces.

7. The method according to claim 1, wherein the vector in the lighting data is defined in tangent space.

8. The method according to claim 1, wherein the angular parameter is an abstract angle having a value between −1 and +1.

9. The method according to claim 1, wherein defining the cone-shaped region using those of the propagated plurality of rays that do not intersect with the simplified mesh comprises:
    calculating a vector by either averaging the propagated plurality of rays which do not intersect with the simplified mesh or selecting two of the propagated plurality of rays which do not intersect with the simplified mesh which are separated by a maximum angle and setting the vector at a mid-point between the two selected rays; and
    calculating an angular parameter based on a dot product of the vector and a selected one of the propagated plurality of rays at a maximum angle to the vector that does not intersect with the simplified mesh.

10. The method according to claim 1, further comprising:
    smoothing parameters defining the cone-shaped region for each vertex across the simplified mesh prior to interpolating the angular parameters and vectors for each vertex.

11. The method according to claim 1, wherein defining the cone-shaped region using those of the propagated plurality of rays that do not intersect with the simplified mesh comprises:
    identifying those rays from the propagated plurality of rays that intersect with the simplified mesh; and
    defining a cone-shaped region that encompasses all the rays that are not identified as intersecting with the simplified mesh.

12. A computer implemented method of rendering a three-dimensional computer generated entity, the method comprising:
    accessing lighting data for at least a part of the three-dimensional computer generated entity, the lighting data defining a cone-shaped region in terms of an angular parameter and a vector for each vertex or pixel; and
    for each light ray incident on a vertex or pixel of the three-dimensional computer generated entity, calculating a lighting contribution of the light ray incident at the vertex or pixel dependent upon a position of the light ray incident relative to the cone-shaped region; and
    rendering the three-dimensional computer generated entity using the calculated lighting contributions,
    wherein the lighting data is generated by:
        receiving a mesh representation of at least a part of the three-dimensional computer generated entity;
        simplifying the mesh by removing vertices from the mesh;
        for each vertex in the simplified mesh determining whether the vertex is blocked by propagating a plurality of rays from the vertex and defining a cone-shaped region having an apex at the vertex using those of the plurality of rays that do not intersect with the simplified mesh, wherein the cone-shaped region is defined in terms of a vector and an angular parameter;
        calculating an interpolated angular parameter and an interpolated vector for each vertex in the received mesh by interpolating the angular parameters and vectors for each vertex in the simplified mesh; and
        outputting the lighting data, the lighting data comprising the angular parameter and vector for each vertex in the received mesh.

13. The method according to claim 12, wherein the vector for each vertex or pixel is defined in tangent space and the method further comprises converting the vector to world space prior to calculating a lighting contribution of the light ray incident at the vertex or pixel dependent upon a position of the light ray incident relative to the cone-shaped region.

14. The method according to claim 12, wherein calculating a lighting contribution of the light ray incident at the vertex or pixel dependent upon a position of the light ray incident relative to the cone-shaped region comprises:
    calculating an angle between the light ray incident and the vector defining the cone-shaped region; and
    determining whether the angle between the light ray incident and the vector defining the cone-shaped region exceeds the angular parameter defining the cone-shaped region.

15. The method according to claim 14, further comprising:
    in response to determining that the angle between the light ray incident and the vector defining the cone-shaped region exceeds the angular parameter defining the cone-shaped region, setting the lighting contribution to indicate that the light ray incident does not light the vertex or pixel; and
    in response to determining that the angle between the light ray incident and the vector defining the cone-shaped region does not exceed the angular parameter defining the cone-shaped region, setting the lighting contribution to indicate that the light ray incident does light the vertex or pixel.

16. The method according to claim 12, wherein each angular parameter in the lighting data is represented as a value between −1 and +1 and calculating a lighting contribution of the light ray incident at the vertex or pixel dependent upon a position of the light ray incident relative to the cone comprises:
    computing a dot product of a normalized version of the light ray incident and the vector defining the cone-shaped region, wherein the vector defining the cone-shaped region is normalized; and
    determining whether the computed dot product exceeds the angular parameter defining the cone-shaped region.

17. The method according to claim 12, wherein each angular parameter in the lighting data is represented as a value between −1 and +1 and calculating a lighting contribution of the light ray incident at the vertex or pixel dependent upon a position of the light ray incident relative to the cone-shaped region comprises:
    computing a dot product of a normalized version of the light ray incident and the vector defining the cone-shaped region, wherein the vector defining the cone-shaped region is normalized;

subtracting the computed dot product from the angular parameter defining the cone-shaped region to generate a difference value;

in response to generating a difference value that does not exceed a first difference threshold, setting the lighting contribution to indicate that the light ray incident does light the vertex or pixel;

in response to generating a difference value that exceeds a second difference threshold, wherein the second difference threshold is higher than the first difference threshold, setting the lighting contribution to indicate that the light ray incident does not light the vertex or pixel; and in response to generating a difference value between the first and second difference thresholds, setting the lighting contribution to indicate that the light ray incident partially lights the vertex or pixel.

18. The method according to claim 17, wherein setting the lighting contribution to indicate that the light ray incident partially lights the vertex or pixel comprises:

generating a lighting contribution value by linearly interpolating between a first lighting contribution value at the first difference threshold and a second lighting contribution value at the second difference threshold, wherein the first lighting contribution value indicates that the light ray incident does light the vertex or pixel and the second lighting contribution value indicates that the light ray incident does not light the vertex or pixel.

19. A computing device comprising:

a processor; and a memory arranged to store device executable instructions that, when executed by the processor, cause the processor to:

receive a mesh representation of at least a part of a computer-generated entity;

simplify the mesh by removing vertices from the mesh;

for each vertex in the simplified mesh determine whether the vertex is blocked by propagating a plurality of rays from the vertex and defining a cone-shaped region using those of the plurality of rays that do not intersect with the simplified mesh, wherein the cone-shaped region is defined in terms of a vector and an angular parameter;

calculate an interpolated angular parameter and an interpolated vector for each vertex in the received mesh by interpolating the angular parameters and vectors for each vertex in the simplified mesh; and store lighting data in a lighting data store in the memory, the lighting data comprising the angular parameter and vector for each vertex in the received mesh.

20. A computing device according to claim 19, further comprising a GPU and wherein the GPU is arranged to:

access the stored lighting data for at least a part of the computer-generated entity;

for each light ray incident on a vertex or pixel of the computer-generated entity, calculate a lighting contribution of the light ray incident at the vertex or pixel dependent upon a position of the light ray incident relative to a cone-shaped region defined by the lighting data for the vertex or pixel; and render the computer-generated entity using the calculated lighting contributions.

* * * * *